US012789420B2

(12) United States Patent
Zhu et al.

(10) Patent No.: US 12,789,420 B2
(45) Date of Patent: Nov. 10, 2026

(54) FORMING MOLD FOR DRUM-SHAPED SHAFT TUBE AND DEMOLDING METHOD THEREFOR

(71) Applicant: Shanghai GKN Huayu Driveline Systems Company Limited, Shanghai (CN)

(72) Inventors: Zhuoxuan Zhu, Shanghai (CN); Fan Yang, Shanghai (CN); Xianggang Meng, Shanghai (CN)

(73) Assignee: Shanghai GKN Huayu Driveline Systems Company Limited, Shanghai (CN)

( * ) Notice: Subject to any disclaimer, the term of this patent is extended or adjusted under 35 U.S.C. 154(b) by 159 days.

(21) Appl. No.: 18/279,216

(22) PCT Filed: Jan. 6, 2022

(86) PCT No.: PCT/CN2022/070446
§ 371 (c)(1),
(2) Date: Aug. 29, 2023

(87) PCT Pub. No.: WO2022/227691
PCT Pub. Date: Nov. 3, 2022

(65) Prior Publication Data
US 2024/0140002 A1 May 2, 2024

(30) Foreign Application Priority Data
Apr. 30, 2021 (CN) ......................... 202110481559.0

(51) Int. Cl.
*B29C 33/48* (2006.01)
*B29C 33/76* (2006.01)
*B29L 23/00* (2006.01)

(52) U.S. Cl.
CPC ............ *B29C 33/485* (2013.01); *B29C 33/76* (2013.01); *B29L 2023/22* (2013.01)

(58) Field of Classification Search
CPC ...... B29C 33/485; B29C 33/76; B29C 53/824
See application file for complete search history.

(56) References Cited

U.S. PATENT DOCUMENTS

2022/0314528 A1* 10/2022 Garcia .................. B33Y 70/00

FOREIGN PATENT DOCUMENTS

CN 202037750 A 11/2011
CN 102764841 A 11/2012
(Continued)

OTHER PUBLICATIONS

CN110454491A—Machine Translation (Year: 2019).*
CN106799798A—Machine Translation (Year: 2017).*
CN107839204A—Machine Translation (Year: 2018).*

*Primary Examiner* — Yunju Kim
(74) *Attorney, Agent, or Firm* — IPRTOP LLC

(57) ABSTRACT

A forming mold for a drum-shaped shaft tube and a demolding method therefor are provided. The forming mold includes a rotating body having a through hole that passes through the center of the body in an axial direction. The body is divided into multiple parts in a longitudinal direction. The parts are combined in a circumferential direction to form the rotating body. A longitudinal maximum material size of each part is less than a minimum diameter of the through hole. Two side edges of a cross section of at least one part are deflected toward adjacent parts with respect to radial lines at which two end points of an outer arc of the cross section are located, and a chord length of the outer arc of the cross section is less than a chord length of an inner arc of the cross section. The body has a forming section.

8 Claims, 2 Drawing Sheets

(56) References Cited

FOREIGN PATENT DOCUMENTS

| | | | | |
|---|---|---|---|---|
| CN | 105945201 A | | 9/2016 | |
| CN | 105945201 Y | | 9/2016 | |
| CN | 106799798 Y | | 6/2017 | |
| CN | 107839204 A | | 3/2018 | |
| CN | 209381234 U | | 9/2019 | |
| CN | 110454491 A | * | 11/2019 | ................ F16C 3/02 |
| CN | 112318782 A | | 2/2021 | |
| CN | 112434389 Y | | 3/2021 | |
| CN | 113172808 A | | 7/2021 | |

* cited by examiner

FORMING MOLD FOR DRUM-SHAPED SHAFT TUBE AND DEMOLDING METHOD THEREFOR

TECHNICAL FIELD

The present disclosure relates to the technical field of power transmission systems, in particular, to a forming mold for a drum-shaped shaft tube and a demolding method therefor.

BACKGROUND

A power transmission shaft is a key component that transmits the power of a driving unit such as an engine or an electric motor to a driven unit. During the power transmission, the transmission shaft bears a torque load with a huge dynamic change, and therefore the performance such as the strength, weight, and noise, vibration, harshness (NVH) of the transmission shaft has a significant impact on its function. A fiber composite shaft tube has the comprehensive advantages such as high strength, high rigidity, and light weight, and therefore the power transmission shaft using the fiber composite shaft tube is an effective development direction.

The fiber composite shaft tube for making the power transmission shaft is usually made of fiber tows such as carbon fiber, boron fiber, glass fiber, aramid fiber, silicon carbide fiber, and the like that are wound around the forming mold and bonded and solidified. The forming method by winding is usually as follows. The surface of the forming mold is cleaned with cleaning agent, the demolding agent is evenly coated on the surface of the forming mold, and the fiber tows pre-impregnated with glue are wound around the outer peripheral surface of the forming mold according to a certain path scheme at a proper winding speed and winding tension to form a fiber composite material layer. The temperature is raised to a certain temperature at a certain heating rate and kept for a certain time, and then cooled to a room temperature, so as to obtain the fiber composite shaft tube through demolding.

At present, the fiber composite shaft tubes that can be used for power transmission shafts include an equal-diameter shaft tube, a concave shaft tube with a thin middle and two thick ends, and a drum-shaped shaft tube. The drum-shaped shaft tube is a variable-diameter shaft tube, which may be in similar variable-diameter contour shapes such as a single-peak drum, a double-peak drum, a multi-peak drum, or a wavy drum with both peaks and valleys. For a structure of the drum-shaped shaft tube, reference may be made to the variable-diameter shaft tube disclosed in the patent for disclosure with the Patent Publication No. CN112434389A, which has a front end section and a rear end section, and a plurality of conical tube sections and a plurality of middle tube sections with different diameters are further arranged between the front end section and the rear end section. The front end section, the middle tube section, and the rear end section are all cylindrical tube sections, and two adjacent cylindrical tube sections are connected by the conical tube sections in transition.

After the equal-diameter shaft tube and the concave shaft tube with a thin middle and two thick ends are formed by winding fiber tows around the forming mold thereof, the forming mold is easily detached from inside of the formed shaft tube, that is, demolding is easily realized. However, after the drum-shaped shaft tube is formed by winding fiber tows around the forming mold thereof, the demolding of the forming mold thereof is relatively difficult. In the prior art, due to the lack of a forming mold for a drum-shaped shaft tube with a simple structure and convenient demolding, the power transmission shaft usually uses a fiber composite equal-diameter shaft tube or a concave shaft tube with a thin middle and two thick ends, and therefore the production and use of the fiber composite drum-shaped shaft tube are limited.

SUMMARY OF THE PRESENT DISCLOSURE

The present disclosure provides a forming mold for a drum-shaped shaft tube with a simple structure and convenient demolding.

In the forming mold for the drum-shaped shaft tube, the drum-shaped shaft tube is a variable-diameter shaft tube made of a fiber composite material. The forming mold comprises a body. The body is a rotating body having a through hole that passes through the center of the body in an axial direction. The body is divided into a plurality of parts in a longitudinal direction. The plurality of parts is combined in a circumferential direction to form the rotating body. The longitudinal maximum material size of each part is less than the minimum diameter of the through hole. Two side edges of a cross section of at least one part are deflected toward adjacent parts with respect to radial lines at which two end points of an outer arc of the cross section are located, and a chord length of the outer arc of the cross section is less than a chord length of an inner arc of the cross section. The body has a forming section. A contour of an outer peripheral surface of the forming section is the same as a contour of an inner peripheral surface of the drum-shaped shaft tube.

Preferably, an included angle between the radial lines at which the two end points of the outer arc of the cross section of the at least one part are located is $\alpha$, and angles by which the two side edges of the cross section of the at least one part are deflected toward the adjacent parts with respect to the radial lines at which the two end points of the outer arc of the cross section of the at least one part are located are $\beta$, and $\alpha/2<\beta<(\alpha/2)+3°$.

Preferably, at least three parts are arranged, and the number of the parts depends on required strength, rigidity, and economic efficiency of each part during demolding of the forming mold.

Preferably, the cross sections of the plurality of parts have equal areas.

Preferably, the body further has a left extended section and a right extended section respectively arranged on a left end surface and a right end surface of the forming section.

Preferably, the left extended section is formed by extending the left end surface of the forming section to the left with a diameter equal to that of the forming section in an axial direction, and the right extended section is formed by extending the right end surface of the forming section to the right with a diameter equal to that of the forming section in the axial direction.

Preferably, the forming mold further comprises a left disc and a right disc, a left annular groove is formed on the left disc, and the left extended section is inserted into and fitted with the left annular groove. A right annular groove is formed on the right disc, and the right extended section is inserted into and fitted with the right annular groove.

Preferably, a length of the left extended section is $L1+\delta1$, a length of the right extended section is $L2+\delta2$, $\delta1$ and $\delta2$ are both process gaps, a depth of the left annular groove is L3, $L3=L1$, a depth of the right annular groove is L4, and $L4=L2$.

Preferably, the through hole is an equal-diameter through hole or a variable-diameter through hole, and a contour of the variable-diameter through hole is similar to a contour of an outer peripheral surface of the body.

Further, the present disclosure also provides a demolding method for the forming mold for a drum-shaped shaft tube. The demolding method comprises: deflecting two side edges of a cross section toward adjacent parts with respect to radial lines at which two end points of an outer arc of the cross section are located, using a part with a chord length of the outer arc of the cross section less than a chord length of the inner arc of the cross section as a first to-be-demolded part, pressing left and right ends of the first to-be-demolded part to cause the first to-be-demolded part to separate from the drum-shaped shaft tube wrapped around the forming section and fall into the through hole, taking out the first to-be-demolded part from the through hole, and sequentially pressing left and right ends of the remaining parts starting from a part adjacent to the first to-be-demolded part to cause the parts to separate from the drum-shaped shaft tube and fall into the through hole and taking out the remaining parts from the through hole one by one.

Compared with the prior art, the present disclosure has significant progress.

The body is divided into multiple parts in a longitudinal direction, and the parts are combined in a circumferential direction to form a complete body during winding and formation of the drum-shaped shaft tube, so as to provide a forming section for winding and forming the drum-shaped shaft tube. After the drum-shaped shaft tube is wound and formed, the parts may be separated from the drum-shaped shaft tube one by one to fall into the through hole and be taken out from the through hole, thereby realizing demolding. The present disclosure has advantages of a simple structure and convenient demolding.

Figure 1:
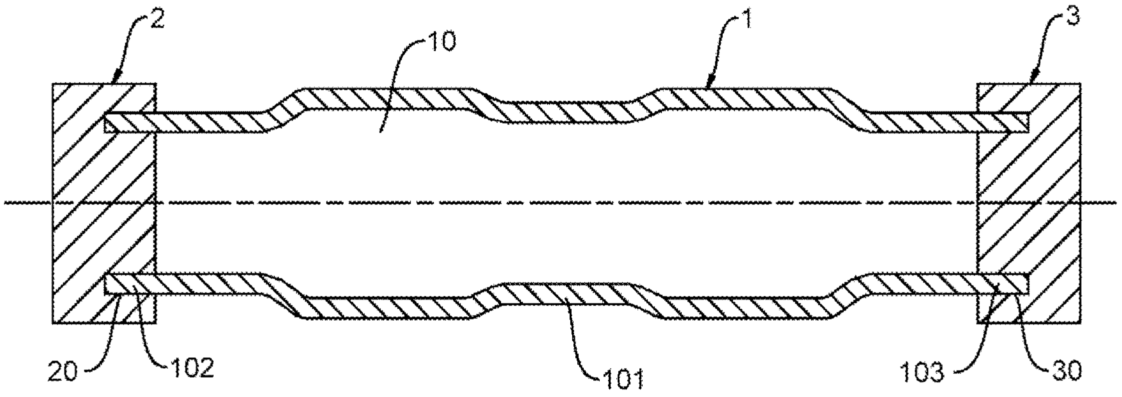
FIG. 1 is a schematic diagram of a longitudinal cross-section of a forming mold for a drum-shaped shaft tube according to an embodiment of the present disclosure.

Reference numerals are as follows.

1: Body
11, 12, 13, 14: Part
11*a*, 12*a*, 13*a*, 14*a*: Cross sections of parts
10: Through hole
101: Forming section
102: Left extended section
103: Right extended section
2: Left disc
20: Left annular groove
3: Right disc
30: Right annular groove

DETAILED DESCRIPTION OF THE PREFERRED EMBODIMENTS

Specific embodiments of the present disclosure are further described in detail below with reference to the accompanying drawings. These embodiments are used to describe the present disclosure, but not to limit the present disclosure.

In the description of the present disclosure, it should be noted that, orientation or position relationships indicted by terms such as "center", "longitudinal", "transverse", "up", "down", "front", "back", "left", "right", "vertical", "horizontal", "top", "bottom", "inside", and "outside" are based on orientation or position relationships shown in the accompanying drawings, are merely to facilitate and simplify the description of the present disclosure, rather than indicating or implying that the indicated device or element should have particular orientations or be constructed and operated in particular orientations, and cannot be construed as a limitation on the present disclosure. In addition, terms "first" and "second" are used to describe the objective and cannot be understood as indicating or implying relative importance.

In the descriptions of the present disclosure, it should be noted that, unless otherwise specified or defined, terms such as "mount", "connect", and "connection" should be understood in a broad sense. For example, the connection may be a fixed connection, a detachable connection, or an integral connection; or the connection may be a mechanical connection or an electrical connection; or the connection may be a direct connection, an indirect connection through an intermediary, or internal communication between two components. Those skilled in the art may understand the specific meanings of the foregoing terms in the present disclosure according to specific situations.

In addition, in the description of the present disclosure, unless otherwise stated, "a plurality of" means two or more.

FIGS. 1 to 5 show an embodiment of a forming mold for a drum-shaped shaft tube of the present disclosure. The drum-shaped shaft tube in this embodiment is a variable-diameter shaft tube made of a fiber composite material, which may be in similar variable-diameter contour shapes such as a single-peak drum, a double-peak drum, a multi-peak drum, or a wavy drum with both peaks and valleys.

Figure 2:
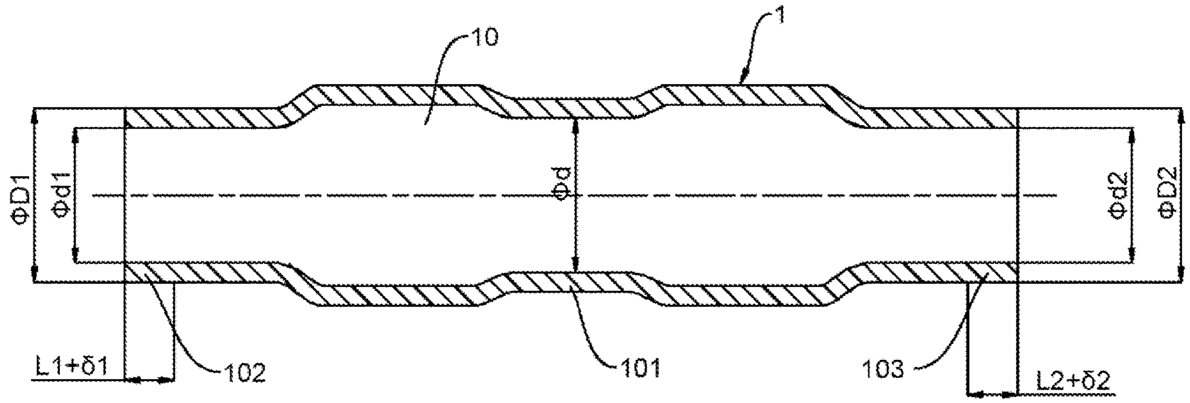
FIG. 2 is a schematic diagram of a longitudinal cross-section of a body in a forming mold for a drum-shaped shaft tube according to an embodiment of the present disclosure.

Refer to FIGS. 1 and 2, the forming mold for a drum-shaped shaft tube of this embodiment comprises a body 1. The body 1 has a forming section 101. A contour of an outer peripheral surface of the forming section 101 is the same as a contour of an inner peripheral surface of the drum-shaped shaft tube. The forming section 101 is an actual operating section on the body 1 during the formation of the drum-shaped shaft tube to be formed. That is, during the operation, the drum-shaped shaft tube with the same contour of the inner peripheral surface as the outer peripheral surface of the forming section 101 is obtained by winding fiber composite tows around the outer peripheral surface of the forming section 101. Therefore, a shape and a size of the contour of the outer peripheral surface of the forming section 101 are determined according to a shape and a size of the contour of the inner peripheral surface of the drum-shaped shaft tube to be formed, and are not limited to a single shape and size.

Figure 3:
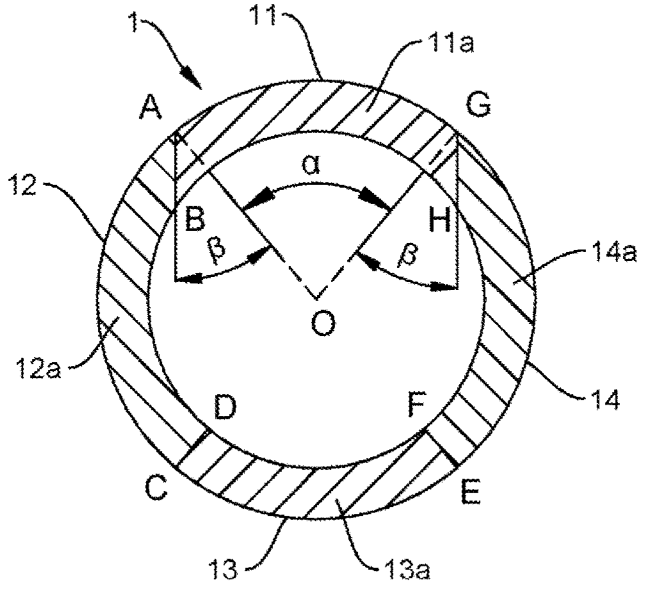
FIG. 3 is a schematic diagram of a cross section of a body in a forming mold for a drum-shaped shaft tube according to an embodiment of the present disclosure.

Refer to FIGS. 2 and 3, the body 1 is a rotating body having a through hole 10 that passes through the center of the body in an axial direction. The body 1 is divided into a plurality of parts 11, 12, 13, and 14 in a longitudinal direction. The plurality of parts 11, 12, 13, and 14 are combined in a circumferential direction to form the rotating body. Longitudinal maximum material sizes of the parts 11, 12, 13, and 14 are all less than a minimum diameter d of the through hole 10, so that any single part 11, 12, 13, or 14 can pass through the through hole 10. Therefore, after the drum-shaped shaft tube is formed by winding fiber composite tows on the forming section 101, the plurality of parts 11, 12, 13, and 14 may be separated from the drum-shaped shaft tube one by one and taken out from the through hole 10 to realize demolding.

Refer to FIG. 3, in the parts 11, 12, 13, and 14, two side edges AB and GH of a cross section 11*a* of at least one part 11 are deflected toward adjacent parts 12 and 14 with respect to radial lines AO and GO at which two end points A and G of the outer arc AG of the cross section 11*a* are located, and a chord length of the outer arc AG of the cross section 11*a* is less than a chord length of an inner arc BH of the cross section 11*a*. That is, the side edge AB of the cross section 11*a* of at least one part 11 is deflected toward an adjacent part 12 with the end point A as the center with respect to the radial line AO at which the end point A of the outer arc AG of the cross section 11*a* is located, and the other side edge GH of the cross section 11*a* of the part 11 is deflected toward the other adjacent part 14 with the end point G as the center with respect to the radial line GO at which the other end point G of the outer arc AG of the cross section 11*a* is located, so that the chord length of the outer arc AG of the cross section 11*a* of the part 11 is less than the chord length of the inner arc BH of the cross section 11*a*, and the cross section 11*a* of the part 11 is approximately trapezoidal in the shape with a narrower outer edge and a wider inner edge. The cross section 11*a* is shaped so that the part 11 can be easily detached from a space between two adjacent parts 12 and 14 toward the through hole 10. Therefore, after the drum-shaped shaft tube is formed by winding fibers on the forming section 101, the part 11 may be used as a breakthrough to demold, and the part 11 is used as a first to-be-demolded part during demolding, so that the part 11 can easily and smoothly separate from the drum-shaped shaft tube and fall into the through hole 10. Then the part 11 is taken out from the through hole 10, that is, the demolding of the part 11 is completed. Then the remaining parts 12, 13, and 14 may be taken out one by one starting from the part 12 adjacent to the part 11 by sequentially causing the parts 12, 13, and 14 to separate from the drum-shaped shaft tube and fall into the through hole 10 and then taking out the parts 12, 13, and 14 from the through hole 10 one by one, thereby completing the demolding of the remaining parts 12, 13, and 14.

In this way, according to the forming mold for a drum-shaped shaft tube of this embodiment, the body 1 is divided into a plurality of parts 11, 12, 13, and 14 in a longitudinal direction, and the plurality of parts 11, 12, 13, and 14 are combined in a circumferential direction to form a complete body 1 during winding and formation of the drum-shaped shaft tube, so as to provide a forming section 101 for winding and forming the drum-shaped shaft tube. After the drum-shaped shaft tube is formed by winding fibers, the plurality of parts 11, 12, 13, and 14 may be separated from the drum-shaped shaft tube one by one to fall into the through hole 10 and be taken out from the through hole 10, thereby realizing demolding. The present disclosure has advantages of a simple structure and convenient demolding.

In this embodiment, side edges AB, GH, CD, and EF of the cross sections 11*a*, 12*a*, 13*a*, and 14*a* of the parts 11, 12, 13, and 14 are dividing lines among the parts 11, 12, 13, and 14 on the cross section of the body 1, and 0 is the center of a circle of the cross section of the body 1 and also the center of a circle of the through hole 10.

Refer to FIG. 3, preferably, an included angle between the radial lines AO and GO at which the two end points A and G of the outer arc AG of the cross section 11*a* of the part 11 are located is $\alpha$, and angles by which the two side edges AB and GH of the cross section 11*a* of the part 11 are deflected toward the adjacent parts 12 and 14 with respect to the radial lines AO and GO at which the two end points A and G of the outer arc AG of the cross section 11*a* of the part are located are $\beta$ and $\alpha/2<\beta<(\alpha/2)+3°$. The angle by which the side edge AB is deflected toward the adjacent part 12 with respect to the radial line AO and the angle by which the side edge GH is deflected toward the adjacent part 14 with respect to the radial line GO may be set equal or unequal provided that the above conditions are satisfied. The size of the included angle $\alpha$ depends on the required area of the cross section 11*a* of the part 11.

The minimum diameter d of the through hole 10 of the body 1 limits the maximum allowable cross-sectional size of the parts 11, 12, 13, and 14, that is, the longitudinal maximum material size of the parts 11, 12, 13, and 14 is limited. In a case that the size of the body 1 is determined, more parts lead to a smaller cross-sectional size of a single part, and it is easier to realize demolding. However, smaller cross-sectional sizes of the parts lead to lower strength and rigidity, and there is the possibility that the part is be greatly bent or broken during demolding, which may lead to the difficulty or even failure of demolding and poor economic efficiency. Therefore, preferably, at least three parts are arranged, and the number of the parts depends on required strength, rigidity, and economic efficiency of each part during demolding of the forming mold. Considering not only the constraint condition of the minimum diameter d of the through hole 10 of the body 1, the premise that any single part can pass through the through hole 10, but also the requirements of the strength, rigidity, and economic efficiency of each part, referring to FIG. 3, in this embodiment, the body 1 is preferably divided into four parts in the longitudinal direction, that is, four parts are provided, that is, a part 11, a part 12, a part 13, and a part 14. Two side edges CD and EF of a cross section 13*a* of the part 13 coincide with the radial lines CO and EO of the cross section 13*a*. That is, the side edge CD of the cross section 13*a* of the part 13 coincides with the radial line CO at which an end point C of an outer arc CE of the cross section 13*a* is located, and the other side edge EF of the cross section 13*a* of the part 13 coincides with the radial line EO at which an end point E of the outer arc CE of the cross section 13*a* is located. Therefore, a chord length of the outer arc CE of the cross section 13*a* of the part 13 is greater than a chord length of the inner arc DF of the cross section 13*a*, and the cross section 13*a* of the part 13 is substantially in the trapezoidal shape with a wider outer edge and a narrower inner edge. The part 12 is located between one side edge of the part 11 and one side edge of the part 13. Therefore, two side edges of the cross section 12*a* of the part 12 respectively coincide with one side edge AB of the cross section 11*a* of the part 11 and one side edge CD of the cross section 13*a* of the part 13. A chord length of the outer arc AC of the cross section 12*a* of the part 12 is greater than a chord length of the inner arc BD of the cross section 12*a*, and the cross section 12*a* of the part 12 is substantially in the trapezoidal shape with a wider outer edge and a narrower inner edge. The part 14 is located between the other side edge of the part 11 and the other side edge of the part 13. Therefore, two side edges of the cross section 14*a* of the part 14 respectively coincide with the other side edge GH of the cross section 11*a* of the part 11 and the other side edge EF of the cross section 13*a* of the part 13. A chord length of the outer arc GE of the cross section 14*a* of the part 14 is greater than a chord length of the inner arc HF of the cross section 14*a*, and the cross section 14*a* of the part 14 is substantially in the trapezoidal shape with a wider outer edge and a narrower inner edge. Therefore, during the combination, the part 11, the part 12, the part 13, and the part 14 can be reliably clamped together to form a complete body 1, thereby ensuring the smooth winding and forming of the drum-shaped shaft tube on the body 1. During the demolding, the parts can be demolded and taken out smoothly and sequentially by using the part 11 as a breakthrough.

Preferably, the areas of cross sections 11*a*, 12*a*, 13*a*, and 14*a* of the plurality of parts 11, 12, 13, and 14 are equal, which is beneficial to maximize the strength and rigidity while minimizing the cross-sectional size of each part. In this embodiment, the body 1 is divided into four equal parts in the longitudinal direction to form four parts 11, 12, 13, and 14 with equal areas of cross sections 11*a*, 12*a*, 13*a*, and 14*a*.

Further, referring to FIG. 2, preferably, the body 1 further includes a left extended section 102 and a right extended section 103. The left extended section 102 is arranged on a left end surface of the forming section 101, and the right extended section 103 is arranged on a right end surface of the forming section 101. Preferably, the left extended section 102 is formed by extending the left end surface of the forming section 101 leftward with the same diameter as the forming section 101 in the axial direction, that is, an inner diameter d1 and an outer diameter D1 of the left extended section 102 are respectively equal to an inner diameter and an outer diameter of the left end surface of the forming section 101. The right extended section 103 is formed by extending the right end surface of the forming section 101 rightward with the same diameter as the forming section 101 in the axial direction, that is, an inner diameter d2 and an outer diameter D2 of the right extended section 103 are respectively equal to the inner diameter and the outer diameter of the right end surface of the forming section 101.

Refer to FIG. 1, preferably, the forming mold for the drum-shaped shaft tube of this embodiment further comprises a left disc 2 and a right disc 3. A left annular groove 20 is formed on the left disc 2, and the left extended section 102 of the body 1 is inserted into and fitted with the left annular groove 20. A right annular groove 30 is formed on the right disc 3, and the right extended section 103 of the body 1 is inserted into and fitted with the right annular groove 30.

Figure 4:
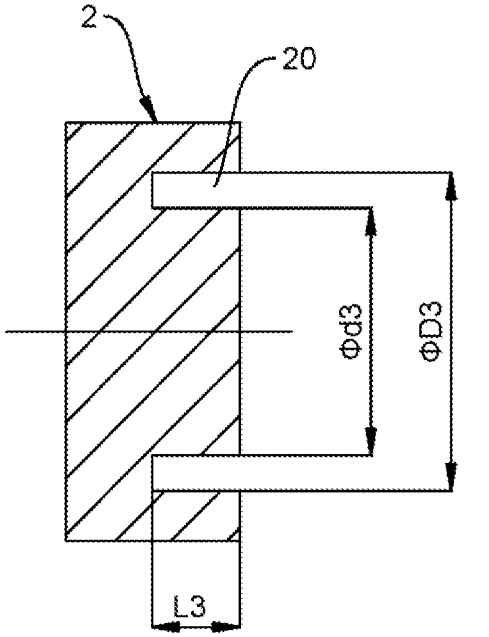
FIG. 4 is a schematic diagram of a longitudinal cross-section of a left disc in a forming mold for a drum-shaped shaft tube according to an embodiment of the present disclosure.

Preferably, referring to FIGS. 1 and 4, an inner diameter d3 and an outer diameter D3 of the left annular groove 20 on the left disc 2 are respectively equal to the inner diameter d1 and the outer diameter D1 of the left extended section 102 of the body 1, so as to ensure that the left extended section 102 of the body 1 closely fits with the left annular groove 20 when inserted into the left annular groove 20 on the left disc 2.

Figure 5:
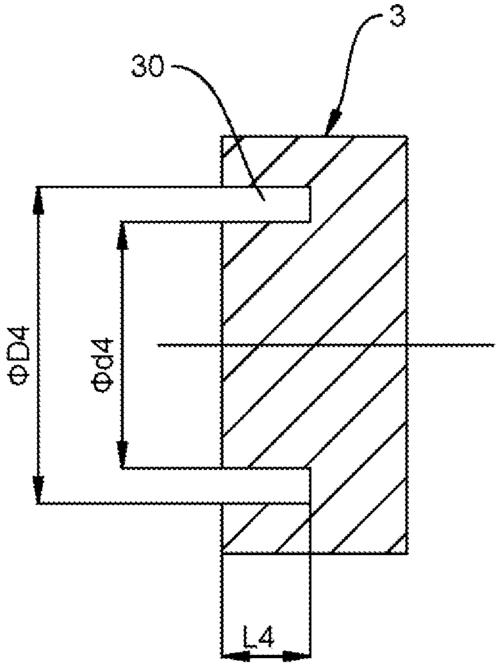
FIG. 5 is a schematic diagram of a longitudinal cross-section of a right disc in a forming mold for a drum-shaped shaft tube according to an embodiment of the present disclosure.

Preferably, referring to FIGS. 1 and 5, an inner diameter d4 and an outer diameter D4 of the right annular groove 30 on the right disc 3 are respectively equal to the inner diameter d2 and the outer diameter D2 of the right extended section 103 of the body 1, so as to ensure that the right extended section 103 of the body 1 closely fits with the right annular groove 30 when inserted into the right annular groove 30 on the right disc 3.

Further, in this embodiment, referring to FIGS. 2, 4, and 5, a length of the left extended section 102 of the body 1 is L1+δ1, and a length of the right extended section 103 of the body 1 is L2+δ2. δ1 and δ2 are both process gaps, and sizes of the gaps may be determined according to the forming process of the drum-shaped shaft tube to be formed. A depth of the left annular groove 20 on the left disc 2 is L3, and L3=L1, a depth of the right annular groove 30 on the right disc 3 is L4, and L4=L2. Therefore, the stability of the close fit of the left extended section 102 of the body 1 with the left annular groove 20 when inserted into the left annular groove 20 on the left disc 2 and the stability of the close fit of the right extended section 103 with the right annular groove 30 when inserted into the right annular groove 30 on the right disc 3 may be further ensured. The sizes of L1, L3, L2, and L4 are not limited and may depend on the manufacturing process.

In this embodiment, the diameter of the through hole 10 of the body 1 is not limited, and the through hole 10 may be an equal-diameter through hole, or the through hole 10 may be a variable-diameter through hole 10. Preferably, the through hole 10 is a variable-diameter through hole 10, and a contour of the variable-diameter through hole 10 is similar to a contour of an outer peripheral surface of the body 1. Preferably, a wall thickness distribution of the body 1 depends on required strength, rigidity, and light weight of the body 1 during formation of the drum-shaped shaft tube to be formed, so that the minimum diameter d of the through hole 10 and the inner diameter d1 of the left extended section 102 and the inner diameter d2 of the right extended section 103 of the body 1 can be determined.

Further, this embodiment further provides a demolding method for the forming mold for the drum-shaped shaft tube described above in this embodiment. The demolding method comprises: deflecting two side edges of a cross section toward adjacent parts with respect to radial lines at which two end points of an outer arc of the cross section are located, using a part with a chord length of the outer arc of the cross section less than a chord length of an inner arc of the cross section as a first to-be-demolded part, that is, using the part 11 as the first to-be-demolded part, pressing left and right ends of the first to-be-demolded part 11 to cause the first to-be-demolded part 11 to separate from the drum-shaped shaft tube wrapped around the forming section 101 and fall into the through hole 10, taking out the first to-be-demolded part 11 from the through hole 10, and sequentially pressing left and right ends of the parts 12, 13, and 14 starting from a part 12 adjacent to the first to-be-demolded part 11 to cause the parts 12, 13, and 14 to separate from the drum-shaped shaft tube and fall into the through hole 10 and then taking out the remaining parts 12, 13, and 14 from the through hole 10 one by one, thereby completing the demolding of the remaining parts 12, 13, and 14.

Specifically, the demolding method for the forming mold for the drum-shaped shaft tube in this embodiment is performed after the drum-shaped shaft tube is formed by winding fibers around the forming section 101 of the body 1. The method comprises the following steps.

Step I: Remove the left disc 2 leftward and the right disc 3 rightward in the axial direction.

Step II: Press both left and right ends of the part 11 toward the center of the through hole 10 in a radial direction to cause the part 11 to separate from the drum-shaped shaft tube wound around the forming section 101 and fall into the through hole 10, and then take out the part 11 falling into the through hole 10 from the through hole 10.

Step III: Press both left and right ends of the part 12 toward the center of the through hole 10 in a direction of radial deflection toward a gap left by the part 11 after the demolding, to cause the part 12 to separate from the drum-shaped shaft tube wound around the forming section 101 and fall into the through hole 10, and then take out the part 11 falling into the through hole 10 from the through hole 10.

Step IV: Demold the remaining parts 13 and 14 by using the manners of step III sequentially, and take out the parts 13 and 14 one by one.

The demolding of all the parts is completed, that is, the demolding of the forming mold for the drum-shaped shaft tube is completed. The whole demolding process is very fast and convenient.

Based on the above, the forming mold for the drum-shaped shaft tube and the demolding method therefor of the present disclosure are designed and determined based on the contour shape of the inner peripheral surface of the fiber composite drum-shaped shaft tube to be formed, according to the strength and rigidity requirements of the forming mold body 1 and the parts 11, 12, 13, and 14 required in the forming process of the drum-shaped shaft tube, and according to the principles of smooth demolding, economic efficiency, and light weight. The present disclosure has advantages of a simple and reliable structure, practical and convenient functions, and wide application range. Therefore, the present disclosure effectively overcomes various disadvantages in the prior art, and has a high industrial utilization value.

The above are the preferred implementations of the present disclosure, and it should be noted that a person skilled in the art may further make several improvements and substitutions without departing from the technical principles of the present disclosure. These improvements and substitutions shall also fall within the protection scope of the present disclosure.

What is claimed is:

1. A forming mold for a drum-shaped shaft tube made of a fiber composite material, wherein the drum-shaped shaft tube has a diameter that varies along an axial direction and comprises at least one radially outwardly enlarged portion at a middle portion of the drum-shaped shaft tube, wherein the forming mold comprises a body, wherein the body is a rotating body having a through hole that passes through the center of the body in an axial direction, wherein the through hole is a variable-diameter through hole along the axial direction, and a contour of the variable-diameter through hole is similar to a contour of an outer peripheral surface of the body, wherein the body has a forming section, and a contour of an outer peripheral surface of the forming section is the same as a contour of an inner peripheral surface of the drum-shaped shaft tube; and the body is divided into a plurality of parts in a longitudinal direction, wherein the plurality of parts is combined in a circumferential direction to form the rotating body, a longitudinal maximum material size of each of the plurality of parts is less than a minimum diameter of the through hole, two side edges of a cross section of at least one of the plurality of parts are deflected toward adjacent parts with respect to radial lines at which two end points of an outer arc of the cross section are located, and a chord length of the outer arc of the cross section is less than a chord length of an inner arc of the cross section, wherein an included angle between the radial lines at which the two end points of the outer arc of the cross section of the at least one of the plurality of parts are located is $\alpha$, and angles by which the two side edges of the cross section of the at least one of the plurality of parts are deflected toward the adjacent parts with respect to the radial lines at which the two end points of the outer arc of the cross section of the at least one of the plurality of parts are located are $\beta$, wherein $\alpha/2<\beta<(\alpha/2)+3°$.

2. The forming mold for the drum-shaped shaft tube as in claim 1, wherein the plurality of parts comprises at least three parts, and a number of the parts depends on required strength, rigidity, and economic efficiency of each part during demolding of the forming mold.

3. The forming mold for the drum-shaped shaft tube as in claim 1, wherein the cross sections of the plurality of parts have equal areas.

4. The forming mold for the drum-shaped shaft tube as in claim 1, wherein the body further has a left extended section and a right extended section respectively arranged on a left end surface and a right end surface of the forming section.

5. The forming mold for the drum-shaped shaft tube as in claim 4, wherein the left extended section is formed by extending the left end surface of the forming section to the left with a diameter equal to that of the forming section in an axial direction, and the right extended section is formed by extending the right end surface of the forming section to the right with a diameter equal to that of the forming section in the axial direction.

6. The forming mold for the drum-shaped shaft tube as in claim 5, wherein the forming mold further comprises a left disc and a right disc, a left annular groove is formed on the left disc, the left extended section is inserted into and fitted with the left annular groove, a right annular groove is formed on the right disc, and the right extended section is inserted into and fitted with the right annular groove.

7. The forming mold for the drum-shaped shaft tube as in claim 6, wherein a length of the left extended section is $L1+\delta1$, a length of the right extended section is $L2+\delta2$, wherein $\delta1$ and $\delta2$ are both process gaps, wherein a depth of the left annular groove is L3, $L3=L1$, a depth of the right annular groove is L4, and $L4=L2$.

8. A demolding method for the forming mold for the drum-shaped shaft tube as claim 1, comprising:

deflecting the two side edges of the cross section toward the adjacent parts with respect to the radial lines at which the two end points of the outer arc of the cross section are located, using the part with the chord length of the outer arc of the cross section less than the chord length of the inner arc of the cross section as a first to-be-demolded part, pressing left and right ends of the first to-be-demolded part to cause the first to-be-demolded part to separate from the drum-shaped shaft tube wrapped around the forming section and fall into the through hole, taking out the first to-be-demolded part from the through hole, and sequentially pressing left and right ends of remaining parts starting from a part adjacent to the first to-be-demolded part to cause the remaining parts to separate from the drum-shaped shaft tube and fall into the through hole and taking out the remaining parts from the through hole one by one.

* * * * *